(12) United States Patent
Ulrich (10) Patent No.: US 11,945,057 B2
(45) Date of Patent: Apr. 2, 2024

(54) BIDIRECTIONAL 3-LEVEL CONVERTER FOR USE IN ENERGY STORAGE SYSTEM FOR WELDING GENERATOR

(71) Applicant: Illinois Tool Works Inc., Glenview, IL (US)

(72) Inventor: James Frank Ulrich, New London, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 705 days.

(21) Appl. No.: 16/259,229

(22) Filed: Jan. 28, 2019

(65) Prior Publication Data

US 2019/0232413 A1 Aug. 1, 2019

Related U.S. Application Data

(60) Provisional application No. 62/623,660, filed on Jan. 30, 2018.

(51) Int. Cl.
*B23K 9/10* (2006.01)
*B23K 9/095* (2006.01)
(Continued)

(52) U.S. Cl.
CPC .......... *B23K 9/1062* (2013.01); *B23K 9/0953* (2013.01); *B23K 9/1043* (2013.01);
(Continued)

(58) Field of Classification Search
CPC .......... H02J 3/32; H02J 7/34; H02M 3/33584; H02M 7/487; H02M 7/4833; H02M 7/483;
(Continued)

(56) References Cited

U.S. PATENT DOCUMENTS 6,243,277 B1 * 6/2001 Sun .................. H02M 1/14
323/222
8,405,001 B2 * 3/2013 Albrecht ............. B23K 9/1006
219/133
(Continued)

FOREIGN PATENT DOCUMENTS

CN 1838517 9/2006
CN 102082515 6/2011
(Continued)

*Primary Examiner* — Nathaniel E Wiehe
*Assistant Examiner* — Dilnessa B Belay
(74) *Attorney, Agent, or Firm* — McAndrews, Held & Malloy, Ltd.

(57) ABSTRACT

A welding-type power system than includes a power supply, a DC power bus, an energy storage device, and a bi-directional converter. The bi-directional converter configured to connect the DC power bus to the energy storage device, and further configured to convert power from the DC power bus to the energy storage device to charge the energy storage device, and to convert power from the energy storage device to the DC power bus in response to a power demand on the DC power bus. The bi-directional converter further configured to balance the DC power bus. A controller is configured to control the duty cycle of the bi-directional converter in order to balance the DC power bus, and control the flow of power between the energy storage device and the DC power bus.

9 Claims, 4 Drawing Sheets

(51) Int. Cl.
*H02J 3/28* (2006.01)
*H02J 3/32* (2006.01)
*H02J 7/34* (2006.01)
*H02M 3/335* (2006.01)
*H02M 7/483* (2007.01)
*H02M 7/487* (2007.01)

(52) U.S. Cl.
CPC .................................. *H02J 3/28* (2013.01); *H02J 3/32* (2013.01); *H02J 7/34* (2013.01); *H02M 3/33584* (2013.01); *H02M 7/4833* (2021.05); *H02M 7/487* (2013.01)

(58) Field of Classification Search
CPC ........... H01M 2250/402; B23K 9/1006; B23K 10/006; B23K 9/1075
See application file for complete search history.

(56) References Cited

U.S. PATENT DOCUMENTS

| | | | | |
|---|---|---|---|---|
| 8,547,073 | B2* | 10/2013 | Fujii | H02J 7/345 323/224 |
| 8,569,652 | B2* | 10/2013 | Albrecht | B23K 9/095 219/130.21 |
| 2015/0060426 | A1* | 3/2015 | Schartner | B23K 9/173 219/130.21 |

FOREIGN PATENT DOCUMENTS

| | | |
|---|---|---|
| CN | 102427302 | 4/2012 |
| CN | 106410910 | 2/2017 |
| CN | 107078662 | 8/2017 |
| CN | 109311045 | 2/2019 |
| IN | 101409517 | 4/2009 |

* cited by examiner

BIDIRECTIONAL 3-LEVEL CONVERTER FOR USE IN ENERGY STORAGE SYSTEM FOR WELDING GENERATOR

PRIORITY CLAIM

This application claims priority to the following application(s), each of which is hereby incorporated herein by reference:

U.S. provisional patent application 62/623,660 titled "BIDIRECTIONAL 3-LEVEL CONVERTER FOR USE IN ENERGY STORAGE SYSTEM FOR WELDING GENERATOR" filed on Jan. 30, 2018.

BACKGROUND

Conventional welding-type power systems provide power for welding-type tools. Some such power systems are coupled to a power supply and an energy storage device. In some systems, a DC power bus provides welding type power for welding-type tools and auxiliary output. Such configurations may require multiple converters to convert power between the DC power bus and the energy storage unit. Further, when providing auxiliary power, the DC power bus may become unbalanced in the absence of a balancing mechanism.

SUMMARY

Apparatus, systems, and methods are disclosed of a welding-type power system including a bi-directional 3-level converter configured to convert power between a power bus and an energy storage device, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

The disclosure relates generally to welding systems, and more particularly, to systems, and methods to convert power between a DC power bus, the DC power bus supplying power to a welding type output and an auxiliary output, and an energy storage unit via a bi-directional 3-level converter. The bi-directional 3-level converter may be configured to balance the DC power bus.

Disclosed are examples of a welding-type power system. Disclosed welding-type power systems include a power source including a DC power bus. The power source may be engine driven, and the DC power bus is fed, for example, directly by a rectifier, or a boost converter. Engine driven welding systems can be employed to turn an electric generator used to power multiple welding-type tools (e.g., a welding-type torch, a wire feeder, a plasma torch, etc.), and can be in use for extended periods of time. In some examples, the DC power bus has a split capacitance, allowing a user to plug in devices (e.g., lighting, small power tools, etc.) to auxiliary power, while the total DC power bus may feed a welding inverter.

Additionally, in some examples a welding type power system may include an energy storage device, such as a battery. An energy storage device can provide power in some circumstances, such as a low power demand at the output (e.g., lighting, small power tools, etc.), or may supplement the DC power bus during a short period of higher power demand (e.g., a brief weld or cut, employing power storage and a switched mode power supply).

Some aspects of this disclosure relate to a bi-directional converter that converts power from the DC power bus to the energy storage device to charge the energy storage device, convert power from the energy storage device to the DC power bus, and balance a split capacitance DC power bus. In some aspects, the converter is a bi-directional three level converter.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "welding-type voltage" refers to a voltage suitable for welding, plasma cutting, induction heating, CAC-A, and/or hot wire welding/preheating (including laser welding and laser cladding).

Figure 1:
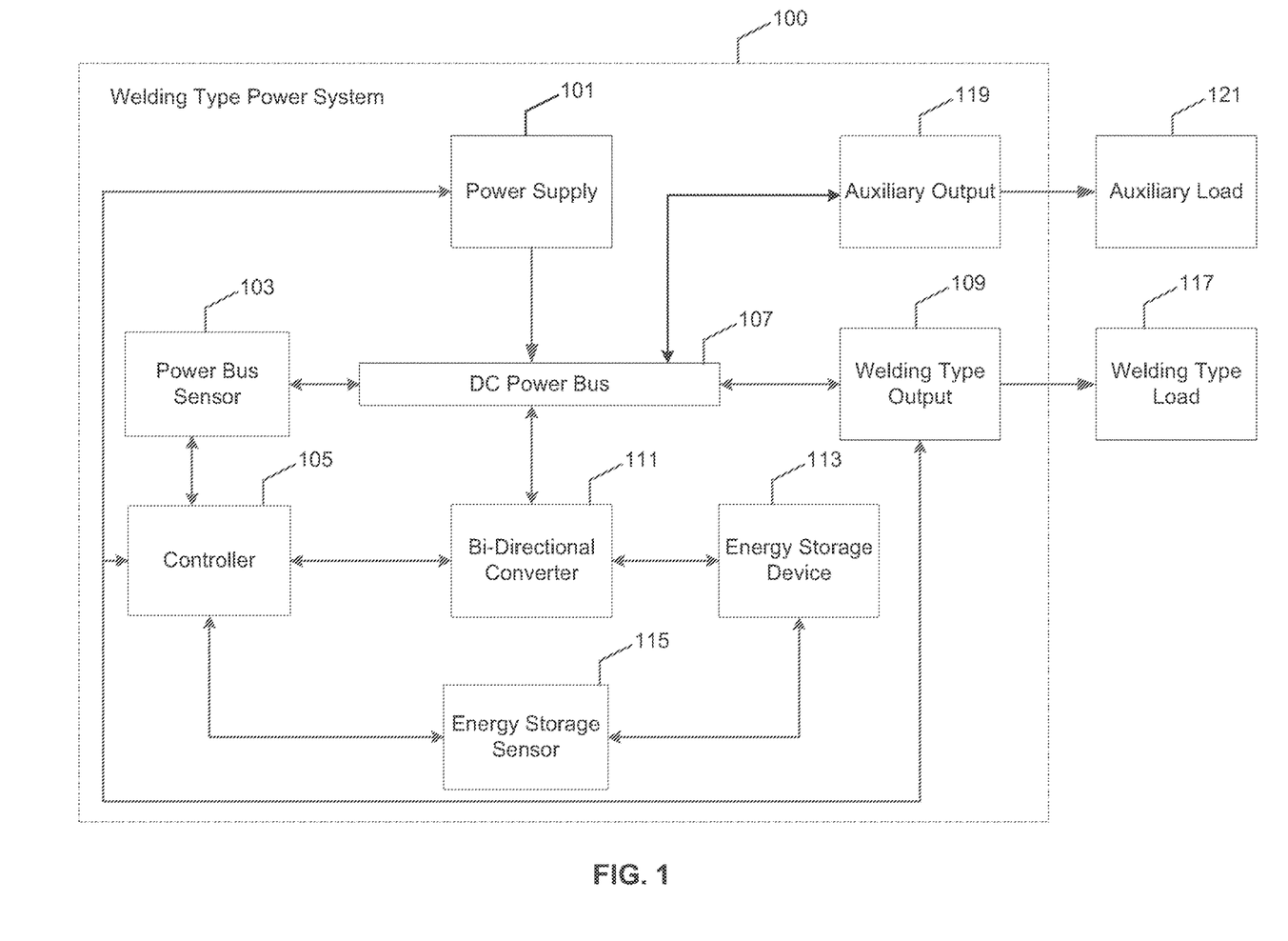
FIG. 1 is a block diagram of an example welding-type power system in accordance with aspects of this disclosure.

FIG. 1 is a block diagram of a welding-type power system 100. The example power system 100 includes a power supply 101 that feeds a DC power bus 107. In some examples, the power supply 101 may include a variable speed engine connected to an electric generator. In some examples, the power supply 101 may feed the DC power bus 107 directly by a rectifier. In other examples the power supply 101 may feed the DC power bus 107 by a boost converter.

A controller 105 is connected to the power supply 101, a DC power bus sensor 103, a bi-directional converter 111, and an energy storage device sensor 115. The bi-directional converter 111 connects the DC power bus 107 to the energy storage device 113 such that the energy storage device 113 can provide power to and/or draw power from the DC power bus 107. The DC power bus sensor 103 is connected to the DC power bus 107 to monitor changes in voltage, current, resistance, etc., associated with the power bus 107. Such changes can indicate power consumption characteristics. The energy storage device sensor 115 is connected to the energy storage device 113 to monitor changes in voltage, current, resistance, etc., associated with the energy storage device 113. Such changes can indicate power consumption characteristics and/or charge level characteristics. In some examples, the controller 105 may be directly linked to the DC power bus 107, the bi-directional converter 111, the energy storage device 113, and the power supply 101, in order to monitor and transmit information and control signals, for example, bus voltage, bus current, and charge/discharge parameters.

The bi-directional converter 111 includes a plurality of switches with adjustable duty cycles, which may be controlled by the controller 105. Adjusting the duty cycles of the switches adjusts the duty cycle of the bi-directional converter 111. By adjusting the duty cycle of the bi-directional converter, the controller can control the flow of power between the DC power bus 107 and the energy storage device 113, thereby converting power from the energy storage device 113 to the DC power bus 107 to supplement the DC power bus 107, or from the DC power bus 107 to the energy storage device 113 to charge the energy storage device 113. In some examples, increasing the duty cycle of the bi-directional converter converts power from the DC power bus 107 to the energy storage device 113, and decreasing the duty cycle converts power from the energy storage device 113 to the DC power bus 107. The flow of power may be controlled for example, in response to a load characteristic detected by the power bus sensor 103 or a charge level characteristic detected by the energy storage sensor 115.

A welding type load 117 can connect to the system 100 via a welding type output 109. The welding type output 109 can be connected to and draw power from the balanced DC power bus 107. The welding-type power system 100 can provide welding-type power to a welding-type torch (e.g., MIG, TIG, GMAW, FCAW, plasma cutter, etc.), a preheating device, a wire feeder, etc., as well as provide battery level power to charge a battery.

One or more auxiliary type loads 121 may connect to the system 100 via an auxiliary output 119. Auxiliary type loads may include lighting, small power tools, etc. The auxiliary output 119 may draw power from the DC power bus 107.

Figure 2:
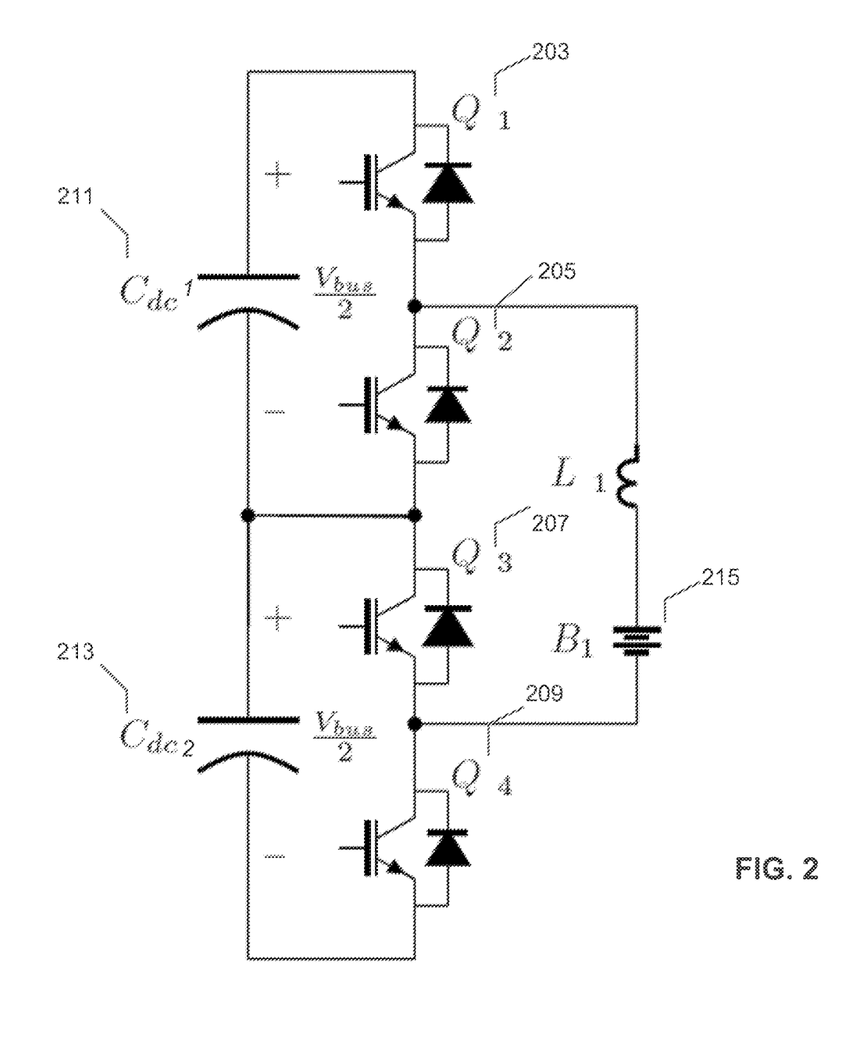
FIG. 2 is a schematic diagram of an example bi-directional 3-level converter.

FIG. 2 is a schematic diagram of an example bi-directional converter 111 of the welding type power system 100. The example bi-directional converter 111 of FIG. 2 has a 3-level buck-boost topology. The bi-directional 3-level converter 111 includes four switches, $Q_1$ 203, $Q_2$ 205, $Q_3$ 207, and $Q_4$ 209. In some examples, the switches $Q_1$ 203, $Q_2$ 205, $Q_3$ 207, and $Q_4$ 209 may be insulated-gate bipolar transistors (IGBTs). The bi-directional 3-level converter 111 further includes two capacitors 211 and 213. When the DC power bus 107 is balanced, the voltage across each capacitor 211 and 213 is balanced. The bi-directional 3-level converter 111 is connected to a battery 215, which corresponds to the energy storage device 113 of FIG. 1. The bi-directional 3-level converter 111 may convert power from the battery 215 to the DC power bus 107, or convert power to the battery 215 from the DC power bus 107 by adjusting the duty cycles of the switches $Q_1$ 203, $Q_2$ 205, $Q_3$ 207, and $Q_4$ 209.

Figure 3:
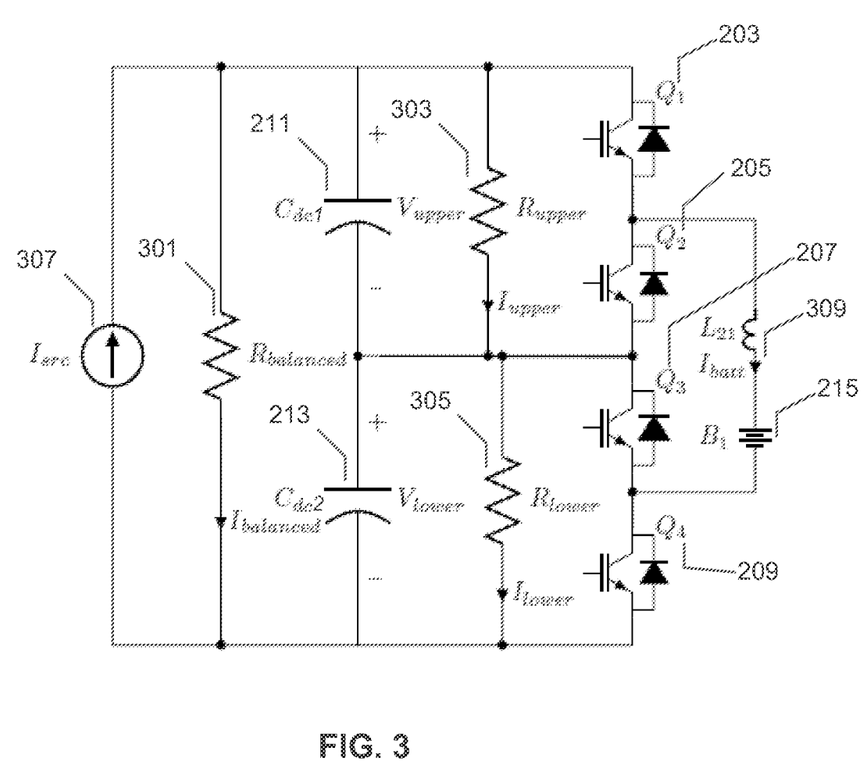
FIG. 3 is a schematic diagram of an example bi-directional 3-level converter supplying an imbalanced load.

FIG. 3 is a schematic diagram of the bi-directional 3-level converter 111 of FIG. 2 supplying an imbalanced load. $C_{dc1}$ 211 and $C_{dc2}$ 213 represent a split DC power bus 107 capacitance. The DC power bus 107 is loaded by three resistors, $R_{balanced}$ 301, which loads the entire DC power bus, $R_{upper}$ 303, which loads only the upper half of the DC power bus, and $R_{lower}$ 305, which loads only the bottom half of the DC power bus. $R_{upper}$ 303 and $R_{lower}$ 305 are represented as resistors, but could also be, for example, constant current or constant power loads.

In an exemplary welding type power system, for example the system 100 as disclosed in FIG. 1, $R_{balanced}$ 301 represents the load drawn by a welding inverter. For example, in FIG. 1, $R_{balanced}$ 301 may correspond to a welding type output 109. Since $R_{balanced}$ 301 is drawn from the entire DC power bus voltage, $R_{balanced}$ 301 does not affect the balance of the voltages across the capacitors $C_{dc1}$ 211 and $C_{dc2}$ 213.

In the same exemplary welding type power system $R_{upper}$ 303 and $R_{lower}$ 305, represent auxiliary power outputs of the welding type power system. Auxiliary output can feed plug-in devices, for example lighting, power tools, etc. If the auxiliary load is imbalanced, the result can cause an unbalance, also called an imbalanced load, to the DC power bus 107.

For example, if $R_{upper}$ 303 and $R_{lower}$ 305, or $I_{upper}$ and $I_{lower}$ (the current through $R_{upper}$ 303 and $R_{lower}$ 305 respectively) are not equal, then the voltages across $C_{dc1}$ 211 and $C_{dc2}$ 213 will not be equal. A difference between the voltages across $C_{dc1}$ 211 and $C_{dc2}$ 213 is referred to as unbalance, or an imbalanced load. An imbalanced load between constant current or constant power loads can cause the entire bus voltage to appear across either $C_{dc1}$ 211 or $C_{dc2}$ 213, while the other capacitor may see no voltage. The capacitor, either $C_{dc1}$ 211 or $C_{dc2}$ 213, is unlikely to be able to withstand the higher voltage, and failure is possible. An imbalanced load may also occur if $C_{dc1}$ 211 and $C_{dc2}$ 213 do not have equal capacitances. When $C_{dc1}$ 211 and $C_{dc2}$ 213 are not equal, the reaction of $C_{dc1}$ 211 and $C_{dc2}$ 213 to changing load conditions will likewise be unequal, thereby creating an imbalanced load.

$I_{batt}$ 309 is the current through the battery 215. $I_{batt}$ 309 can be controlled by adjusting the output duty cycle of the bi-directional 3-level converter 111. The duty cycle of the bi-directional 3-level converter relates to the ratio of time that $I_{batt}$ 309 is increasing compared to the total switching period. Each of the switches, $Q_1$ 203, $Q_2$ 205, $Q_3$ 207, and $Q_4$ 209, has a duty cycle, which refers to the ratio of time that each switch is on compared to the total switching period. Adjusting the duty cycles of the switches $Q_1$ 203, $Q_2$ 205, $Q_3$ 207, and $Q_4$ 209 adjusts the duty cycle of the bi-directional 3-level converter 111. In one example, when $Q_1$ 203 is on, $Q_2$ 205 is off, and when $Q_4$ 209 is on, $Q_3$ 207 is off. In this example, a higher duty cycle for $Q_1$ 203 and/or $Q_4$ 209 will increase the voltage provided to the battery 215, and increase the value of $I_{batt}$ 309, the current through the battery 215. Conversely, decreasing the duty cycle for $Q_1$ 203 and/or $Q_4$ 209 will decrease the voltage provided to the battery 215, and decrease the value of $I_{batt}$ 309. If the duty cycle for $Q_1$ 203 and/or $Q_4$ 209 is decreased sufficiently, $I_{batt}$ 309 may become negative. When $I_{batt}$ 309 is negative, the battery 215 is supplying power to the DC power bus 107. When $I_{batt}$ 309 is positive, the battery 215 is drawing power from the DC power bus 107. Therefore, by adjusting the duty cycle of $Q_1$ 203 and/or $Q_4$ 209, power may be drawn from the DC power bus 107 to the battery 215, or power may be provided from the battery 215 to the DC power bus 107. In some examples, the frequency of the switching of the switches $Q_1$ 203, $Q_2$ 205, $Q_3$ 207, and $Q_4$ 209 rather than the duty cycles of the switches $Q_1$ 203, $Q_2$ 205, $Q_3$ 207, and $Q_4$ 209 may be adjusted in order to control $I_{batt}$ 309.

In a 3-level converter, $Q_1$ 203 and $Q_4$ 209 do not need to operate equal amounts of time in a given cycle. Because $Q_1$ 203 and $Q_4$ 209 do not need to operate equal amounts of time in a given cycle, the duty cycles of $Q_1$ 203 and $Q_4$ 209 can be adjusted to balance a split DC power bus, or the voltages across $C_{dc1}$ 211 or $C_{dc2}$ 213.

For example, if $I_{batt}$ 309 is positive, and the upper bus voltage, or the voltage across $C_{dc1}$ 211, is greater than the lower bus voltage, or the voltage across $C_{dc2}$ 213, $Q_1$ 203 should be turned on for a longer time than $Q_4$ 209. Or, if $I_{batt}$ 309 is negative, which occurs when the battery 215 is discharging power to the DC power bus 107, and the upper bus voltage is greater than the lower bus voltage, the on time of the upper section of the converter ($Q_1$ 203 and $Q_2$ 205) is lower than the on time of the lower section of the converter ($Q_3$ 207 and $Q_4$ 209) in order to decrease the upper bus voltage and thereby balance the DC power bus voltage. In some examples, the frequency of the switching of the switches $Q_1$ 203, $Q_2$ 205, $Q_3$ 207, and $Q_4$ 209 rather than the duty cycles of the switches $Q_1$ 203, $Q_2$ 205, $Q_3$ 207, and $Q_4$ 209 may be adjusted in order to control $I_{batt}$ 309 and thereby balance the DC power bus 107.

In some examples, when the welding type power system 100 is only operating on battery supplied power, the bus balancing ability of a bi-directional 3-level converter as described above is important because any bus balancing typically provided by a power supply 101 may be unavailable.

In some examples, the controller 105 may use hysteretic control to balance the DC power bus 107 and the conversion of power between the DC power bus 107 and the energy storage device 113, or more specifically the battery 215 by adjusting the on times of the switches $Q_1$ 203, $Q_2$ 205, $Q_3$ 207, and $Q_4$ 209. When hysteretic control is used, references to fixed duty periods as discussed above are no longer necessary. Rather, when hysteretic control is used, the qualitative references to time are important. For example, in order to increase battery voltage, or to increase $I_{batt}$ 309, $Q_1$ 203 and/or $Q_4$ 209 stays on for more time on average than $Q_1$ 203 and/or $Q_4$ 209 previously were over the course of a given time interval. Conversely, in order to draw power from the battery 215 to the DC power bus 107, or to decrease $I_{batt}$ 309 or to make $I_{batt}$ 309 negative, $Q_1$ 203 and/or $Q_4$ 209 stays on for less time on average than $Q_1$ 203 and/or $Q_4$ 209 previously were over the course of a given time interval. Or to balance the DC power bus 107, for example, if $I_{batt}$ 309 is positive, and the upper bus voltage, or the voltage across $C_{dc1}$ 211, is greater than the lower bus voltage, or the voltage across $C_{dc2}$ 213, $Q_1$ 203 should be turned on for a longer time than $Q_4$ 209 on average over a given time interval. Or conversely, if $I_{batt}$ 309 is negative, and the upper bus voltage is greater than the lower bus voltage, then on time of the upper section of the converter ($Q_1$ 203 and $Q_2$ 205) is lower than the on time of the lower section of the converter ($Q_3$ 207 and $Q_4$ 209) on average over the course of a given time interval in order to decrease the upper bus voltage and thereby balance the DC power bus voltage.

Referring to FIG. 1, the information provided by the various components to the controller, either directly or through the sensors 103 and 115, may be used for example to instruct the bi-directional converter 111 to convert power from the DC power bus 107 to charge the energy storage device 113, or to convert power from the energy storage device 113 to the DC power bus 107. For example, energy may be converted from the energy storage device 113 to the DC power bus in response to a load characteristic detected by the controller on the DC power bus 107. Further, power may be converted from the DC power bus 107 to the energy storage device 113 in response to charge characteristics of the energy storage device 113. In some examples, energy may be converted from the DC power bus 107 to the energy storage device 113 to maintain a certain charge level of the energy storage device 113.

Referring to FIG. 3, the rate at which power is converted from the DC power bus 107 to charge the battery 215 (or the energy storage device 113), or from the battery 215 (or the energy storage device 113) to the DC power bus 107, is correlated to $I_{batt}$ 309. In the example schematic of FIG. 3, when $I_{batt}$ 309 is positive, power is converted from the DC power bus 107 to charge the battery 215 (or the energy storage device 113). When $I_{batt}$ 309 is negative, power is converted from the battery 215 (or the energy storage device 113) to the DC power bus 107. The greater the value of $I_{batt}$ 309, the more power is being converted from the DC power bus 107 to charge the battery 215 (or the energy storage device 113). The controller may adjust the on times of the switches $Q_1$ 203, $Q_2$ 205, $Q_3$ 207, and $Q_4$ 209 in order to adjust $I_{batt}$ 309.

For example, in response to a welding type load characteristic detected on the DC power bus 107, the controller 105 may adjust the on times of the switches $Q_1$ 203, $Q_2$ 205, $Q_3$ 207, and $Q_4$ 209 in order to provide power from the energy storage device 113 to supplement the DC power bus 107. Or, when no welding type load characteristic is detected on the DC power bus 107, and the controller 105 detects that the energy storage device 113 is not fully charged, the controller 105 may adjust the on times of the switches $Q_1$ 203, $Q_2$ 205, $Q_3$ 207, and $Q_4$ 209 in order to provide charging power to the energy storage device 113 from the DC power bus 107. In some examples, when the controller 105 detects that the energy storage device 113 is fully charged, the controller 105 may adjust the on times of the switches $Q_1$ 203, $Q_2$ 205, $Q_3$ 207, and $Q_4$ 209 in order to bring $I_{batt}$ 309 to a level that will maintain the amount of energy stored in the energy storage device 113. In some examples, the controller 105 may detect that the DC power bus 107 is unbalanced (i.e. an imbalanced load). This may be caused for example, by an imbalanced auxiliary load. In such a case, the controller 105 may adjust the on times of the switches $Q_1$ 203, $Q_2$ 205, $Q_3$ 207, and $Q_4$ 209 to balance the DC power bus 107.

Figure 4:
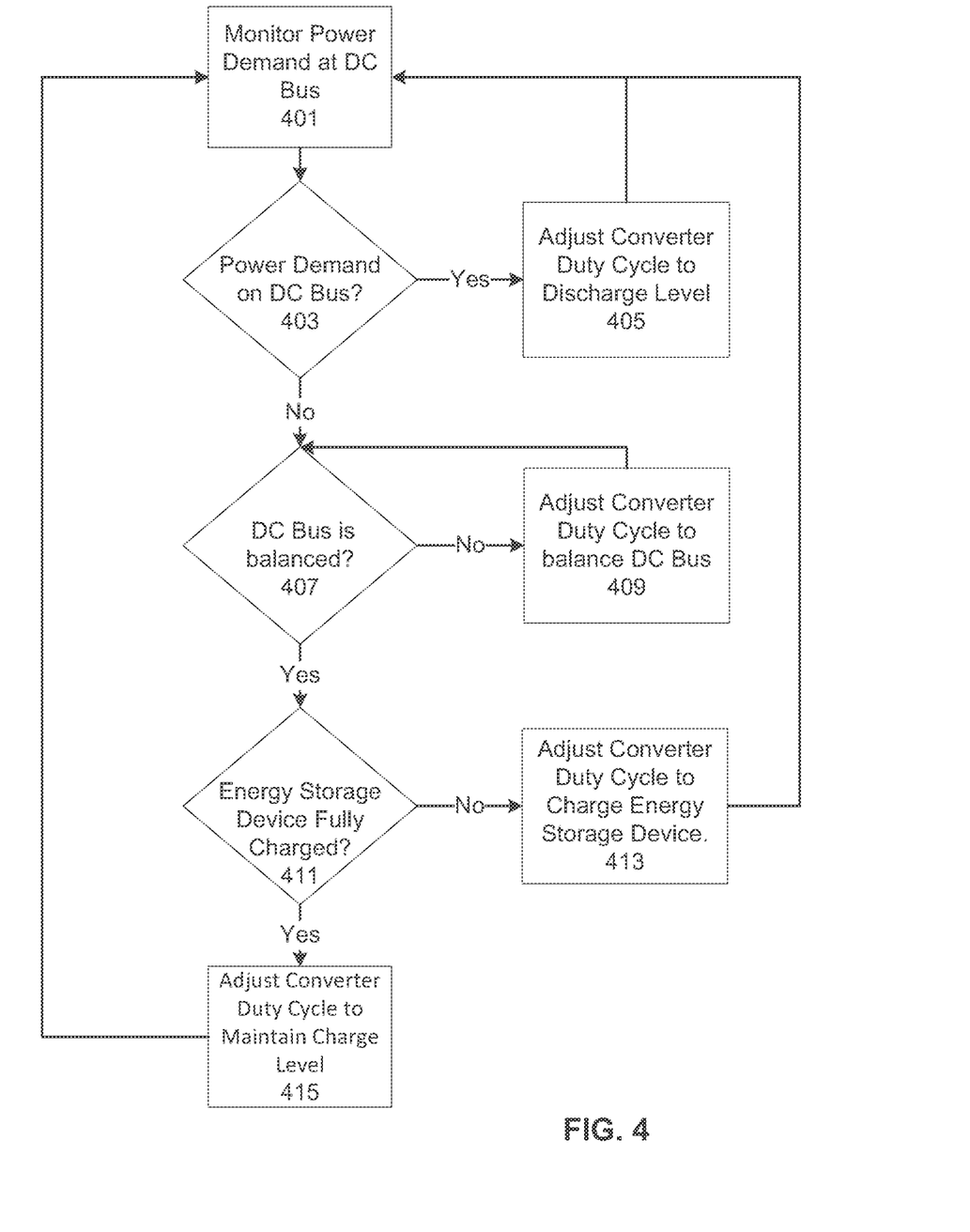
FIG. 4 illustrates an example method of operating a welding-type power system in accordance with aspects of this disclosure.

FIG. 4 illustrates an example method of operating a welding-type power system. At block 401, the controller 105 monitors for a power demand at the DC power bus 107. The controller 105 monitors for changes in voltage, current, resistance, etc. which can be characteristic of a power demand caused by a welding-type load on the DC power bus 107. At block 403, the controller determines whether there is a power demand on the DC power bus 107. If there is a power demand on the DC power bus 107, then at block 405 the controller adjusts the on times of the switches of the bi-directional converter 111 to convert power from the energy storage device 113 to the DC power bus 107 in order to supplement the power provided by the DC power bus 107 to the welding type load 117.

At block 407, the controller determines if the DC power bus 107 is balanced. When auxiliary loads 121 are connected to auxiliary outputs 119, the split DC power bus 107 may become unbalanced absent a balancing control. When the welding type power system 100 is operating solely on power provided by the energy storage device 113, the normal bus balancing operations provided by the power supply 101 may not operate to balance the bus. Therefore, if the controller 105 detects that the DC power bus 107 is not balanced, then at block 409 the controller adjusts the on times of the switches of the bi-directional converter 111 to balance the DC power bus 107. The controller 105 may then check again at block 407 to ensure that the DC power bus 107 unbalance has been corrected by adjusting the on times of the switches of the bi-directional converter 111. If the DC power bus 107 is still unbalanced, then at block 409, the controller will again adjust the on times of the switches of the bi-directional converter 111 to balance the DC power bus 107. Blocks 407 and 409 may be repeated until the DC power bus 107 is balanced.

If the DC power bus 107 is balanced, at block 411, the controller 105 may determine if the energy storage device 411 is fully charged by monitoring the voltage, current, resistance, etc., associated with the energy storage device 113. If the energy storage device 413 is not fully charged, at block 413, the controller 105 adjusts the on times of the switches of the bi-directional converter 111 to convert power from the DC power bus 107 to the energy storage device 113 in order to charge the energy storage device 113. If the controller 105 determines at block 411 that the energy storage device 113 is fully charged, then at block 415 the controller 105 may adjust the on times of the switches of the bi-directional converter 111 to convert power from the DC power bus 107 to the energy storage device 113 at a rate that will maintain the charge level of the energy storage device 113. The controller 105 may then return to block 401 to monitor the power demand at the DC power bus 107.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components, any analog and/or digital components, power and/or control elements, such as a microprocessor or digital signal processor (DSP), or the like, including discrete and/or integrated components, or portions and/or combination thereof (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power system, comprising:
   a power supply;
   an energy storage device;
   a power bus connected to a power output of the power supply and to a welding-type output;
   a sensor configured to detect a power load characteristic on the power bus;
   a bi-directional 3-level converter connected to the power bus and the energy storage device, the bi-directional 3-level converter arranged between the energy storage device and the power bus, the bi-directional 3-level converter comprising a plurality of switches; and
   a controller configured to:
      adjust an output duty cycle of the bi-directional 3-level converter to control a magnitude and direction of a current as measured through the energy storage device,
      convert power from the power bus to recharge the energy storage device, and
      convert power from the energy storage device to provide power to the power bus, at a certain power conversion rate, in order to maintain the power load characteristic on the power bus at a predetermined value.

2. The welding-type power system of claim 1, wherein the controller is configured to adjust a duty cycle corresponding to each of the plurality of switches to thereby adjust the output duty cycle of the bi-directional 3-level converter.

3. The welding-type power system of claim 2, the controller configured to increase the output duty cycle of the bi-directional 3-level converter to control the current to flow in a first direction through the energy storage device to convert power from the power bus to recharge the energy storage device, and to decrease the output duty cycle of the bi-directional 3-level converter to control the current to flow in a second direction through the energy storage device to convert power from the energy storage device to provide power to the power bus.

4. The welding-type power system of claim 3, wherein the controller is further configured to adjust the output duty cycle of the bi-directional 3-level converter to balance the power bus in response to an imbalanced load.

5. The welding-type power system of claim 4, wherein the controller is a hysteretic controller.

6. The welding-type power system of claim 3, the power bus further configured to provide power to at least one auxiliary power device.

7. The welding-type power system of claim 1, further comprising a charge sensor configured to detect an energy storage device charge level characteristic, wherein the controller is configured to adjust the output duty cycle of the bi-directional 3-level converter in response to the charge level characteristic to maintain a charge level of the energy storage device.

8. The welding-type power system of claim 7, wherein the charge level characteristic is a voltage level measured at the energy storage device.

9. The welding-type power system of claim 7, wherein the power load characteristic is a voltage level measured at the power bus.

\* \* \* \* \*